Figure 1:
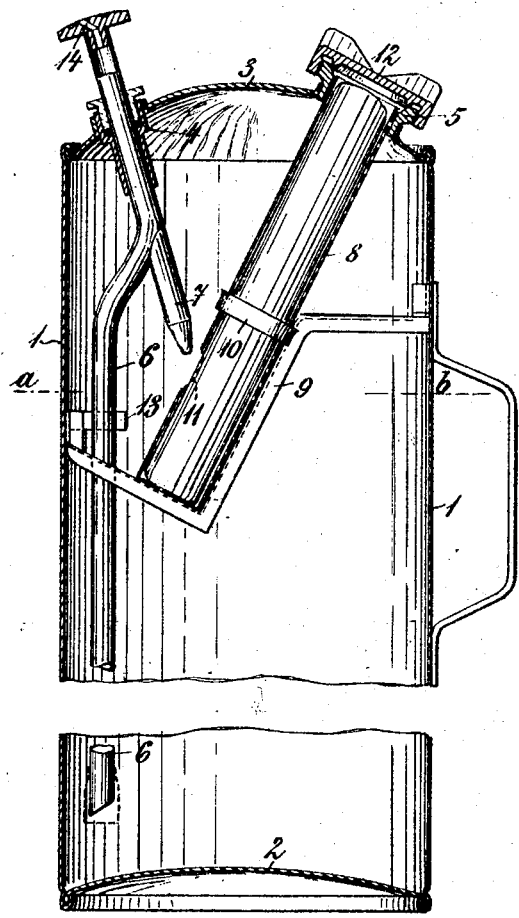

Nov. 3, 1925.

W. MAGG

PORTABLE FIRE EXTINGUISHER

Filed Feb. 23, 1924

1,559,721

Inventor
W. Magg
By Marks & Clerk
Attys.

Patented Nov. 3, 1925.

1,559,721

UNITED STATES PATENT OFFICE.

WOLFGANG MAGG, OF VIENNA, AUSTRIA.

PORTABLE FIRE EXTINGUISHER.

Application filed February 23, 1924. Serial No. 694,601.

*To all whom it may concern:*

Be it known that I, WOLFGANG MAGG, a citizen of the Austrian Republic, and residing at 8 Widerhofergasse, Vienna IX, Austria, have invented certain new and useful Improvements in Portable Fire Extinguishers, of which the following is a specification.

This invention relates to portable fire extinguishers of the kind comprising an outer receptacle containing a liquid, which is intended to be mixed with acid contained in a breakable acid vessel arranged within said receptacle, the said acid vessel being smashed by means of a suitable striker, when the extinguisher is to be used.

In some extinguishers of this kind the acid vessel is fitted in the bottom of the outer receptacle, which has the drawback that, when the acid vessel is smashed, the acid owing to its great specific gravity settles at the bottom of the outer receptacle and only mixes gradually with the liquid contained therein. In other previously proposed constructions the acid vessel is fitted in the lid of the outer receptacle. In this case the striker acts in the direction of the longitudinal axis of the acid vessel, whereby only the upper portion of the acid vessel may be broken, so that only a small portion of the acid will come into action. It has also been proposed to arrange the acid vessel transversely across the outer receptacle. This arrangement has the drawback that the receptacle must be laid on its side when it is to be filled and in addition to this it is difficult to remove glass splinters from the interior of the outer vessel, while it is difficult to pack in a pressure-tight manner the fitting inserted in the wall of the outer receptacle for supporting the acid vessel and moreover the cost of maintaining the apparatus for service is increased, apart from the fact that the appearance of the apparatus is spoilt by the parts which project from the wall of the outer receptacle and the extinguisher is easily damaged. It has further been proposed to fix the acid vessel horizontally on the lower end of a plunger, while a striking pin is mounted in the bottom of the outer receptacle. This construction has the drawback that it is difficult to seal the lid, which must be removed for enabling the acid vessel to be replaced, if the proper sealing of the lid is not to be obtained at the expense of its easy removal. On the other hand the means for suspending the acid vessel and the striking pin are liable to be bent out of place if the apparatus is not carefully handled, whereby there is a possibility that, when the plunger is pushed in, the striking pin will not come into contact with the acid vessel at the right place, but will glance off it, thereby rendering the action of the extinguisher unreliable.

The present invention has for its object to overcome these drawbacks and with this object in view the acid vessel and the striker are mounted on the lid of the outer receptacle in such a manner that their longitudinal axes are disposed at an angle to one another, the striker coming into action against the lower portion of the acid vessel.

This particular manner of supporting the acid vessel and the striker on the lid has the advantage that the mounting of these parts is simple in itself, the apparatus can be filled when in the upright position and, owing to the fracturing of the acid vessel taking place at its lower portion, it will be assured that the whole of the acid will run out of the vessel.

Figure 2:
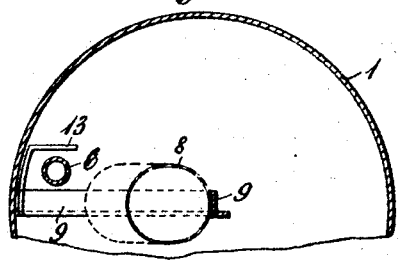

A constructional form of the invention is shown by way of example in the accompanying drawings, in which Fig. 1 is a part longitudinal section and Fig. 2 a part cross-section along line *a—b* in Fig. 1

Referring to the drawings the casing 1 of the outer fluid receptacle is closed in a fluid and gas-tight manner at its lower end by the bottom 2 and at its upper end by the lid 3, the attachment of the lid and bottom to the casing 1 being effected by seaming. The lid preferably consists of two layers, a thin inner layer of high grade material, for instance sheet copper, and a thicker outer layer of lower grade material, for instance sheet iron. Two openings are provided in the lid, the edges of which are bent outwardly so as to form short connecting nozzles in which the packing gland and guide 4 for the striker and the screwed sleeve 5 for the acid vessel are fixed.

The striker consists of an extension piece 7 rigidly connected to the delivery pipe 6, the path through which the striker moves, when operated to fracture the acid vessel, forming an angle with the longitudinal axis of the said acid vessel 8. The acid vessel 8 or its perforated cage rests upon an angularly bent support 9, which is fixed to the wall 1 of the outer receptacle and carries a ring 10, which secures the perforated cage with the acid vessel in position. In the lower half of the perforated cage, which is prevented from turning by suitable means, an opening 11 is provided for the striker 7, so that the fracture of the acid vessel takes place at the lower portion thereof, thereby ensuring that the whole of the acid will flow out of the vessel without any remaining behind. The screwed sleeve 5 is closed by means of a screw cap 12 provided with a sealing rib.

The delivery pipe 6 is suitably joggled at the point where the striking pin 7 is joined on to it and is prevented from turning in the gland 4 by being caused to pass down between the lower portion of the angularly bent support 9 and an arm 13 fixed thereto. 14 is the nozzle opening through which the liquid flows out after the smashing of the acid vessel.

What I claim is:—

A portable fire extinguisher, comprising in combination an outer receptacle, a lid provided on said outer receptacle, an acid vessel the upper part of which passes through the said lid, a slidable delivery pipe supported on said lid, a striker provided on said delivery pipe for fracturing said acid vessel, the longitudinal axis of the striker and the longitudinal axis of the acid vessel forming an angle with each other, the prolongation of the axis of the striker intersecting the axis of the said vessel in the lower part of the latter, a perforated cage for the acid vessel, an angular supporting member for supporting said cage and for guiding said delivery pipe, and an inwardly extending projecting member connected to said supporting member, said projecting member being intended to co-operate with said supporting member for preventing the delivery pipe from turning.

In testimony whereof I have signed my name to this specification.

WOLFGANG MAGG.